(12) United States Patent
Kitabayashi (10) Patent No.: US 9,184,556 B2
(45) Date of Patent: Nov. 10, 2015

(54) OPTICAL MULTIPLEXER AND FIBER LASER

(75) Inventor: Tomoharu Kitabayashi, Chiba (JP)

(73) Assignee: FUJIKURA LTD., Tokyo (JP)

( * ) Notice: Subject to any disclaimer, the term of this patent is extended or adjusted under 35 U.S.C. 154(b) by 594 days.

(21) Appl. No.: 13/144,745

(22) PCT Filed: Jan. 8, 2010

(86) PCT No.: PCT/JP2010/050185
§ 371 (c)(1),
(2), (4) Date: Jul. 15, 2011

(87) PCT Pub. No.: WO2010/084796
PCT Pub. Date: Jul. 29, 2010

(65) Prior Publication Data
US 2011/0274125 A1 Nov. 10, 2011

(30) Foreign Application Priority Data

Jan. 23, 2009 (JP) ................................. 2009-012564

(51) Int. Cl.
*H04J 14/00* (2006.01)
*H01S 3/30* (2006.01)
(Continued)

(52) U.S. Cl.
CPC ............ *H01S 3/302* (2013.01); *H04B 10/2916* (2013.01); *G02F 1/353* (2013.01);
(Continued)

(58) Field of Classification Search
CPC .............. H04J 14/0298; H04J 14/0227; H04J 14/0213; H04B 10/2916; H04B 10/2941
USPC ..................................... 398/48, 62, 76, 79, 82
See application file for complete search history.

(56) References Cited

U.S. PATENT DOCUMENTS 8,295,314 B2   10/2012  Kitabayashi
2003/0030890 A1*  2/2003  Tanaka et al. ................. 359/334
(Continued)

FOREIGN PATENT DOCUMENTS

CN   1700079 A   11/2005
EP   2164140 A1   3/2010
(Continued)

OTHER PUBLICATIONS

International Preliminary Report on Patentability (Form PCT/IB/373) of International Application No. PCT/JP2010/050185 (Date of issuance of the report) Jul. 26, 2011 with Form PCT/ISA/237.
(Continued)

*Primary Examiner* — Dzung Tran
(74) *Attorney, Agent, or Firm* — Westerman, Hattori, Daniels & Adrian, LLP (57) ABSTRACT

An object of the present invention is to provide an optical multiplexer and a fiber laser for obtaining high-output light of a single wavelength. The optical multiplexer according to the present invention is provided with input units 11 and 12, a wavelength multiplexing unit 14, a multiplexed light converting unit 15 and an output unit 16. Lights of a plurality of wavelengths $\lambda_1$ and $\lambda_2$ are input to the input units 11 and 12, respectively. The wavelength multiplexing unit 14 wavelength-multiplexes the lights of the plurality of wavelengths $\lambda_1$ and $\lambda_2$ input from the input units 11 and 12 different for each wavelength to one multiplexed light. By wavelength-multiplexing, it is possible to multiplex without a loss. The multiplexed light converting unit 15 generates Raman light with at least one wavelength out of the wavelengths $\lambda_1$ and $\lambda_2$ included in the multiplexed light from the wavelength multiplexing unit 14 and converts the multiplexed light of the wavelengths $\lambda_1$ and $\lambda_2$ from the wavelength multiplexing unit 14 to light of a single wavelength $\lambda_m$ included in a wavelength band of the Raman light.

43 Claims, 10 Drawing Sheets

(51) Int. Cl.
*H04B 10/291* (2013.01)
*G02F 1/35* (2006.01)
*H01S 3/067* (2006.01)
*H01S 3/094* (2006.01)
*H01S 3/10* (2006.01)

(52) U.S. Cl.
CPC ....... *G02F2203/585* (2013.01); *H01S 3/06729* (2013.01); *H01S 3/06741* (2013.01); *H01S 3/094096* (2013.01); *H01S 3/10015* (2013.01)

(56) References Cited

U.S. PATENT DOCUMENTS

| | | |
|---|---|---|
| 2005/0078714 A1* | 4/2005 | Komine .............................. 372/3 |
| 2007/0127123 A1 | 6/2007 | Brown et al. |
| 2008/0069572 A1* | 3/2008 | Ikeda et al. ................... 398/158 |
| 2008/0085128 A1 | 4/2008 | Rothenberg et al. |
| 2008/0145055 A1* | 6/2008 | Perrier et al. ................... 398/92 |
| 2010/0135340 A1 | 6/2010 | Kitabayashi |

FOREIGN PATENT DOCUMENTS

| | | |
|---|---|---|
| JP | 10-118038 A | 5/1998 |
| JP | 2003-107543 A | 4/2003 |
| WO | 2007/127356 A2 | 11/2007 |
| WO | 2009/001852 A1 | 12/2008 |
| WO | 2009001852 A1 | 12/2008 |

OTHER PUBLICATIONS

Japanese Office Action dated Nov. 5, 2013, issued in corresponding Japanese Patent Application No. 2010-547458 with partial English translation (4 pages).

International Search Report of PCT/JP2010/050185, mailing date Feb. 9, 2010.

Chinese Office Action dated Jun. 13, 2013, issued in corresponding Chinese Patent Application No. 201080005205.9 with partial English translation (14 pages).

* cited by examiner

OPTICAL MULTIPLEXER AND FIBER LASER

TECHNICAL FIELD

The present invention relates to an optical multiplexer and a fiber laser, and especially relates to the optical multiplexer and the fiber laser for providing a high-output fiber laser with an excellent beam quality.

BACKGROUND ART

Recently, a high-output of the fiber laser has been developed and the fiber laser of which output is over 10 kW is available commercially. Such high-output fiber laser is increasingly used industrially in various fields such as a processor, a medical device and a measuring device, and especially, in a field of material processing, since the fiber laser may perform precision processing because this is more excellent in a light collecting property than other lasers, power density of which is high and this may obtain a small beam spot, and since this performs non-contact processing and this may also perform processing of a hard material, which may absorb laser light, application thereof is rapidly enlarged.

Such fiber laser over 10 kW is generally realized by multiplexing output lights of a plurality of fiber lasers of which outputs are few tens of W to few kW. A coherent beam system or a wavelength beam system are used to multiplex the output lights (for example, refer to the patent documents 1 to 3).

The coherent beam system generates phase coupling to multiplex by adjusting phases of a plurality of laser output lights oscillated at the same wavelength (for example, refer to the patent document 1). According to this, high-output light of the same wavelength is obtained.

Herein, a method of generating the phase coupling without performing phase control is suggested (for example, refer to the patent document 2). In this method, cores of two optical fibers are moved closer to each other in a part of an oscillator, light, which leaks from the core of one optical fiber, is optically coupled with the core of the other optical fiber, thereby performing injection locking. According to this, the two fiber lasers automatically oscillate with the same phase and it is possible to multiplex the laser output lights without individually performing the phase control.

On the other hand, in the wavelength beam system, a plurality of laser outputs of different oscillation wavelengths are allowed to enter a diffraction grating and the lights after diffraction are spatially overlapped with each other by utilizing difference in diffraction angles for each wavelength (for example, refer to the patent document 3). According to this, the high-output light is obtained.

RELATED ART DOCUMENTS

Patent Documents

Patent Document 1: US Patent Publication No. 20080085128
Patent Document 2: Japanese Patent Application Laid-Open No. 10-118038
Patent Document 3: US Patent Publication No. 20070127123

DISCLOSURE OF INVENTION

Problem to be Solved by the Invention

In the coherent beam system, it is required to precisely control such that the laser lights, which individually oscillate, are in phase. The phase of the laser light easily changes by disturbance, so that the control thereof is difficult, and there has been a problem that a control system is extremely complicated.

Also, in a method of generating the phase coupling without performing the phase control, a coupling unit is necessarily present in the oscillator, so that it is difficult to make an optical coupler, which may be used as the coupling unit, in a case of the fiber laser of a clad pump type used in the high-output fiber laser.

In the wavelength beam system, the diffraction grating is extremely expensive, and it is necessary to separate the wavelengths of the fiber lasers to be multiplexed by approximately 1 nm in general. Therefore, when multiplexing a great number of fiber lasers, a wavelength spectrum width of the laser after the multiplexing becomes significantly large and there has been a problem that an expensive optical component should be used in order to remove chromatic aberration in actual processing application, especially micro processing and the like.

Therefore, an object of the present invention is to provide the optical multiplexer and the fiber laser for obtaining the high-output light of the single wavelength.

Means for Solving the Problems

In order to solve the above-described problem, an optical multiplexer according to the present invention is provided with a wavelength multiplexing unit for wavelength-multiplexing lights of a plurality of wavelengths input from input units different for each wavelength to one multiplexed light; and a multiplexed light converting unit for generating Raman light with at least one wavelength out of the wavelengths included in the multiplexed light from the wavelength multiplexing unit and converting the multiplexed light from the wavelength multiplexing unit to light of a single wavelength included in a wavelength band of the Raman light.

The wavelength multiplexing unit multiplexes the lights of the different wavelengths, thereby generating high-output multiplexed light including a plurality of wavelengths. Herein, by wavelength-multiplexing, it is possible to multiplex without a coupling loss. Further, since the optical fiber in which Raman scattering is generated is connected to a subsequent stage of the wavelength multiplexing unit, the plurality of wavelengths included in the multiplexed light may be converted to the single wavelength. According to this, the high-output light of the single wavelength may be generated. Also, according to this configuration, the phase control is not necessary and the light of the single wavelength may be generated by a simple structure.

In the optical multiplexer according to the present invention, the single wavelength is preferably the same wavelength as a longest wavelength out of the wavelengths included in the multiplexed light from the wavelength multiplexing unit.

The optical multiplexer directly outputs the light of the longest wavelength input to the input unit. Therefore, it is possible to output the high-output single wavelength light.

In the optical multiplexer according to the present invention, the single wavelength is preferably the wavelength longer than a longest wavelength out of the wavelengths included in the multiplexed light from the wavelength multiplexing unit.

There is a case in which the light output from the multiplexed converting unit is reflected to enter a laser light source connected to the input unit. Since the single wavelength is outside a gain wavelength band of the laser light source, damage of the laser light source may be prevented even when the light of the single wavelength enters the laser light source.

In the optical multiplexer according to the present invention, it is preferable that the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength.

In the multiplexed light converting unit, the multiplexed light is converted to the light of a longer wavelength. At that time, since the multiplexed light converting unit blocks the wavelength longer than the single wavelength, the light of the single wavelength may be efficiently generated.

In the optical multiplexer according to the present invention, it is preferable that the multiplexed light converting unit is a fiber for continuously causing a loss in a waveguide direction for N-th order Raman light out of N-th order of the Raman light and inhibiting generation of N-th order induced Raman scattering light.

A transmission wavelength band and a block wavelength band of the fiber maybe set by a structure thereof. According to this, the light of the single wavelength may be efficiently generated.

In the optical multiplexer according to the present invention, it is preferable that the fiber is a photonic bandgap fiber (PBGF) in which an (N−1)-th order wavelength is set within a bandgap wavelength band and a wavelength of the N-th order Raman light is set outside the bandgap wavelength band.

By using the PBGF, the transmission wavelength band and the block wavelength band of the fiber may be set.

A fiber laser according to the present invention is provided with the optical multiplexer according to the present invention and a plurality of laser light sources of which output wavelengths are different from each other, wherein the plurality of laser light sources supply lights of the output wavelengths to the different input units of the optical multiplexer.

According to the fiber laser, the lights of a plurality of wavelengths from the laser light sources are converted to the light of the single wavelength, so that the high-output light of the single wavelength may be generated. Since the optical multiplexer wavelength-multiplexes, generation of the coupling loss when multiplexing the output lights from a plurality of laser light sources may be prevented from generating.

In the fiber laser according to the present invention, it is preferable that at least one of the plurality of laser light sources is provided with an output light converting unit for generating Raman light by light allowed to enter and converting to the light of the output wavelength to be supplied to the optical multiplexer.

Even when the light generating units of a plurality of laser light sources generate the lights of the same wavelength, the lights of the different wavelengths may be input to the input units. According to this, the light generated by each laser light source may be wavelength-multiplexed without a loss by the wavelength multiplexing unit.

Effect Of The Invention

According to the present invention, the optical multiplexer and the fiber laser for obtaining the high-output light of the single wavelength may be provided.

BEST MODE(S) FOR CARRYING OUT THE INVENTION

Embodiments of the present invention are described with reference to the attached drawings. The embodiments described hereinafter are examples of a configuration of the present invention and the present invention is not limited to the following embodiments.

(First Embodiment)

Figure 1:
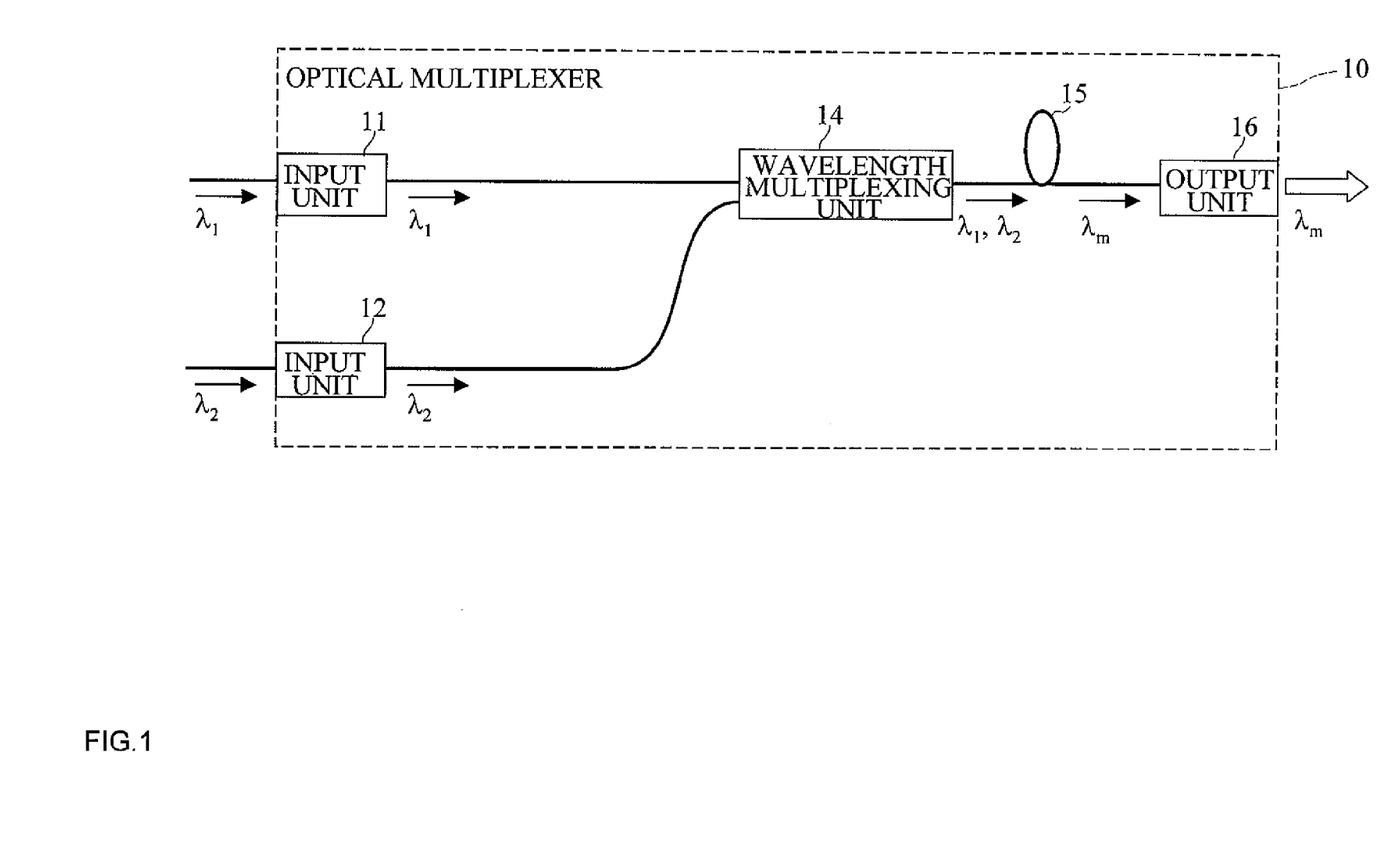
FIG. 1 is a schematic configuration diagram of an optical multiplexer according to a first embodiment.

FIG. 1 is a schematic configuration diagram of an optical multiplexer according to this embodiment. An optical multiplexer 10 according to this embodiment is provided with input units 11 and 12, a wavelength multiplexing unit 14, a multiplexed light converting unit 15 and an output unit 16. Input ports of the wavelength multiplexing unit 14 are connected to the input units 11 and 12 of the optical multiplexer 10, respectively. An output port of the multiplexed light converting unit 15 is connected to the output unit 16 of the optical multiplexer 10.

Lights of wavelengths $\lambda_1$ and $\lambda_2$ are input to the input units 11 and 12, respectively. The wavelengths $\lambda_1$ and $\lambda_2$ are different from each other.

The wavelength multiplexing unit 14 wavelength-multiplexes the lights of a plurality of wavelengths $\lambda_1$ and $\lambda_2$ input from the input units 11 and 12 different for each wavelength to one multiplexed light. By wavelength-multiplexing, a plurality of input lights may be multiplexed without a loss. A wavelength division multiplexer (WDM) may be used as the wavelength multiplexing unit 14.

The multiplexed light from the wavelength multiplexing unit 14 is input to the multiplexed light converting unit 15. The multiplexed light converting unit 15 converts the multiplexed light of the wavelengths $\lambda_1$ and $\lambda_2$ from the wavelength multiplexing unit 14 to light of a single wavelength $\lambda_m$. For example, the multiplexed light converting unit 15 is a fiber, which generates Raman light by the light of at least one wavelength out of the wavelengths $\lambda_1$ and $\lambda_2$ included in the multiplexed light from the wavelength multiplexing unit 14. Then, the light of the single wavelength $\lambda_m$ is output from the output unit 16 of the optical multiplexer 10. For example, the wavelengths $\lambda_1$ and $\lambda_2$ are set to 1040 nm, 1090 nm or 1140 nm.

Figure 2:
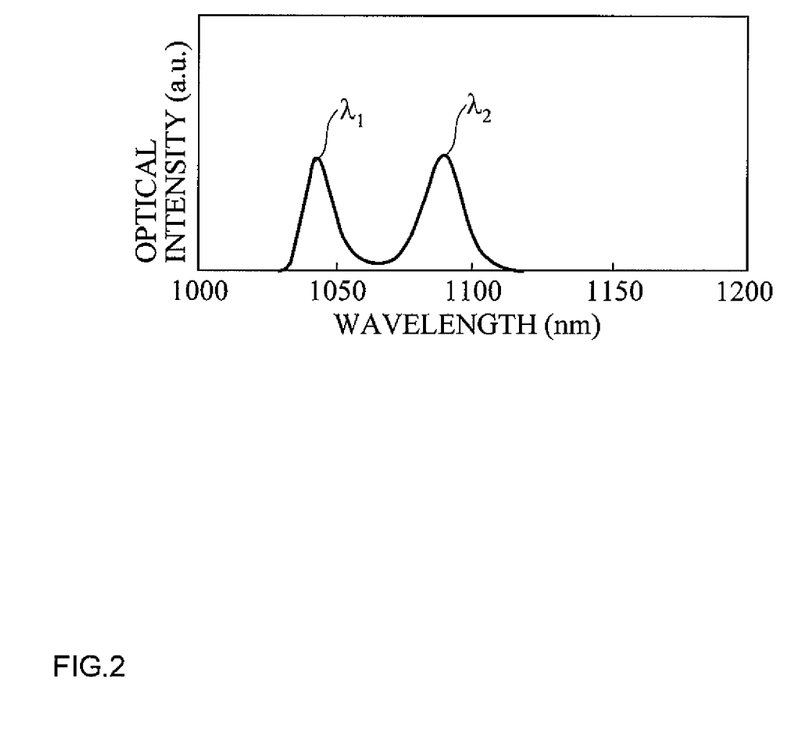
FIG. 2 is an example of a spectrum of propagating light in each part of a multiplexed light converting unit 15 which illustrates an input light spectrum to the multiplexed light converting unit.
Figure 3:
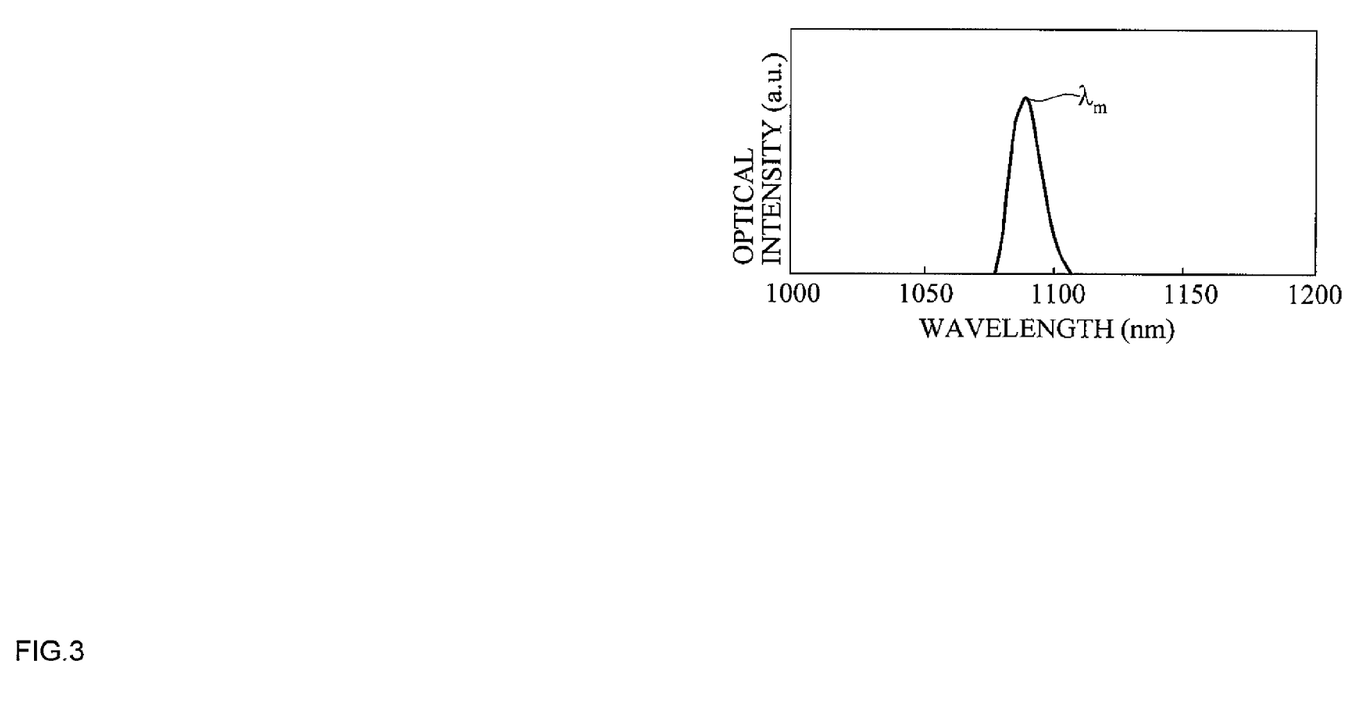
FIG. 3 is an example of a spectrum of propagating light in each part of a multiplexed light converting unit 15 which illustrates an output light spectrum from the multiplexed light converting unit.

FIGS. 2 and 3 are an example of a spectrum of propagating light in each part of the multiplexed light converting unit 15 in which FIG. 2 illustrates an input light spectrum to the multiplexed light converting unit and FIG. 3 illustrates an output light spectrum from the multiplexed light converting unit. Since each of the light of the wavelength $\lambda_1$ and the light of the wavelength $\lambda_2$ is converted to the single wavelength $\lambda_m$, optical intensity of the single wavelength $\lambda_m$ is a value closer to a sum of the optical intensity of the wavelength $\lambda_1$ and the optical intensity of the wavelength $\lambda_2$. In this manner, the optical multiplexer 10 illustrated in FIG. 1 may output the light of the single wavelength $\lambda_m$ with large optical intensity by including the wavelength multiplexing unit 14 and the multiplexed light converting unit 15. Although a case in which the number of the input units is two is described in this embodiment, by increasing the number of the input units to three, four, five, etc., the optical intensity of the single wavelength $\lambda_m$ from the output unit 16 may be further increased.

When the multiplexed light converting unit 15 performs wavelength conversion using Raman scattering, the single wavelength $\lambda_m$ is included in a wavelength band of the Raman light generated by the multiplexed light converting unit 15. Therefore, the single wavelength $\lambda_m$ is the same wavelength as the longest wavelength $\lambda_2$ out of the wavelengths $\lambda_1$ and $\lambda_2$ included in the multiplexed light from the wavelength multiplexing unit 14 or the wavelength longer than the longest wavelength $\lambda_2$.

Herein, it is preferable that the single wavelength $\lambda_m$ is the same wavelength as the longest wavelength $\lambda_2$ out of the wavelengths $\lambda_1$ and $\lambda_2$ included in the multiplexed light from the wavelength multiplexing unit 14. In this case, in the multiplexed light converting unit 15, the light of a short wavelength (wavelength $\lambda_1$) out of the input two lights of different wavelengths is converted to the other light of the wavelength $\lambda_2$ to be output. Since the optical intensity of the light of the wavelength $\lambda_2$ is not decreased by the multiplexed light converting unit 15, the optical intensity of the single wavelength $\lambda_m$ may be improved.

Also, it is preferable that the single wavelength $\lambda_m$ is the wavelength longer than the longest wavelength $\lambda_2$ out of the wavelengths $\lambda_1$ and $\lambda_2$ included in the multiplexed light from the wavelength multiplexing unit 14. There is a case in which the light output from the output unit 16 to outside is reflected to enter laser light sources connected to the input units 11 and 12. For example, when the laser light source is a fiber laser, by setting the single wavelength $\lambda_m$ outside a gain wavelength band of an amplifying fiber of the fiber laser, the light of the single wavelength $\lambda_m$ is not amplified even when the light of the single wavelength $\lambda_m$ enters the laser light source. Therefore, the light with large power is not generated in the laser light source, so that damage of the laser light source may be prevented.

In order to output the light of the single wavelength $\lambda_m$ from the multiplexed light converting unit 15 illustrated in FIG. 1, it is preferable that the multiplexed light converting unit 15 transmits the wavelength not shorter than the shortest wavelength $\lambda_1$ and not longer than the single wavelength $\lambda_m$ out of the wavelengths $\lambda_1$ and $\lambda_2$ included in the multiplexed light from the wavelength multiplexing unit 14 and blocks the wavelength longer than the single wavelength $\lambda_m$. For example, it is preferable that the multiplexed light converting unit 15 is the fiber, which continuously causes a loss in a waveguide direction for N-th order Raman light out of the generated Raman light, thereby inhibiting generation of N-th order induced Raman scattering light. Especially, it is preferable that the multiplexed light converting unit 15 is a PBGF, which causes the loss distributed in the waveguide direction for high-order Raman light, thereby inhibiting generation of high-order induced Raman light. That is to say, it is preferable that a bandgap wavelength band of the PBGF includes the shortest wavelength $\lambda_1$ and the single wavelength $\lambda_m$ and does not include a wavelength of a desired order, for example, a secondary Raman light of the shortest wavelength $\lambda_1$. According to this, the continuous loss in the waveguide direction is generated for the desired order (for example, secondary) Raman light and generation of desired order (for example, secondary) Raman scattering light may be inhibited. Further, by winding the PBGF into a coil pattern, the bandgap wavelength band may be finely adjusted.

Herein, the order of the induced Raman light to be inhibited is optional. For example, when the single wavelength $\lambda_m$ is set to the same wavelength as the wavelength $\lambda_2$ and as the wavelength of primary Raman scattering of the wavelength $\lambda_1$, the wavelength of the secondary Raman light of the wavelength $\lambda_1$ is inhibited. Also, when the single wavelength $\lambda_m$ is set to the same wavelength as the wavelength of secondary Raman scattering of the wavelength $\lambda_1$ and when the wavelength $\lambda_2$ is set to the same wavelength as the wavelength of the primary Raman scattering of the wavelength $\lambda_1$, the wavelength of tertiary Raman light of the wavelength $\lambda_1$ is inhibited. In this manner, the order of the induced Raman light to be inhibited is preferably equal or larger than the number of the ports of the input unit.

Figure 4:
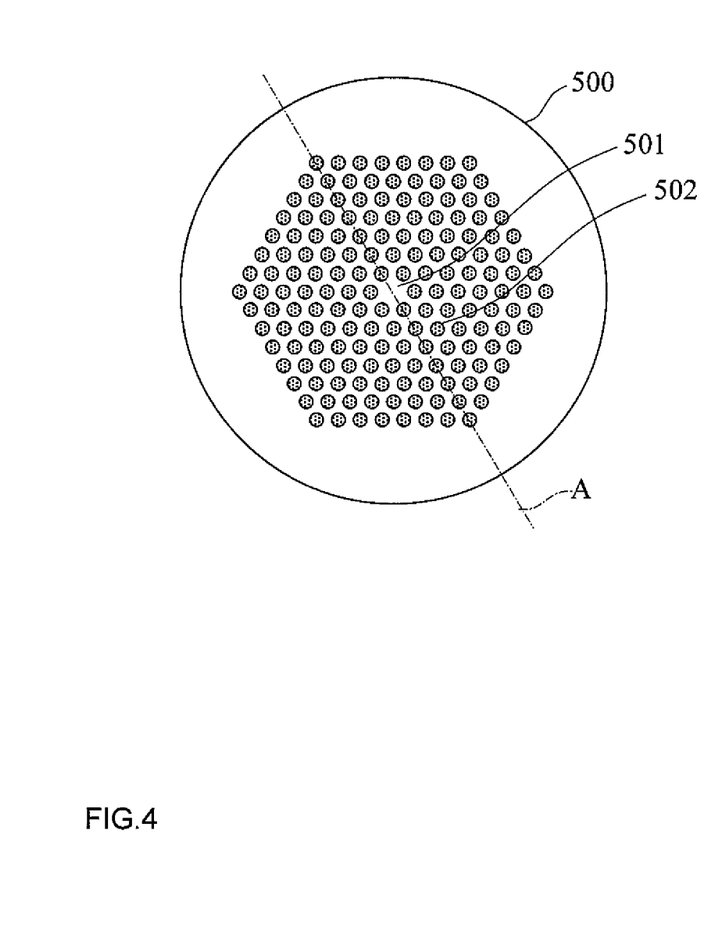
FIG. 4 is an example of a PBGF which is a transverse sectional view.
Figure 5:
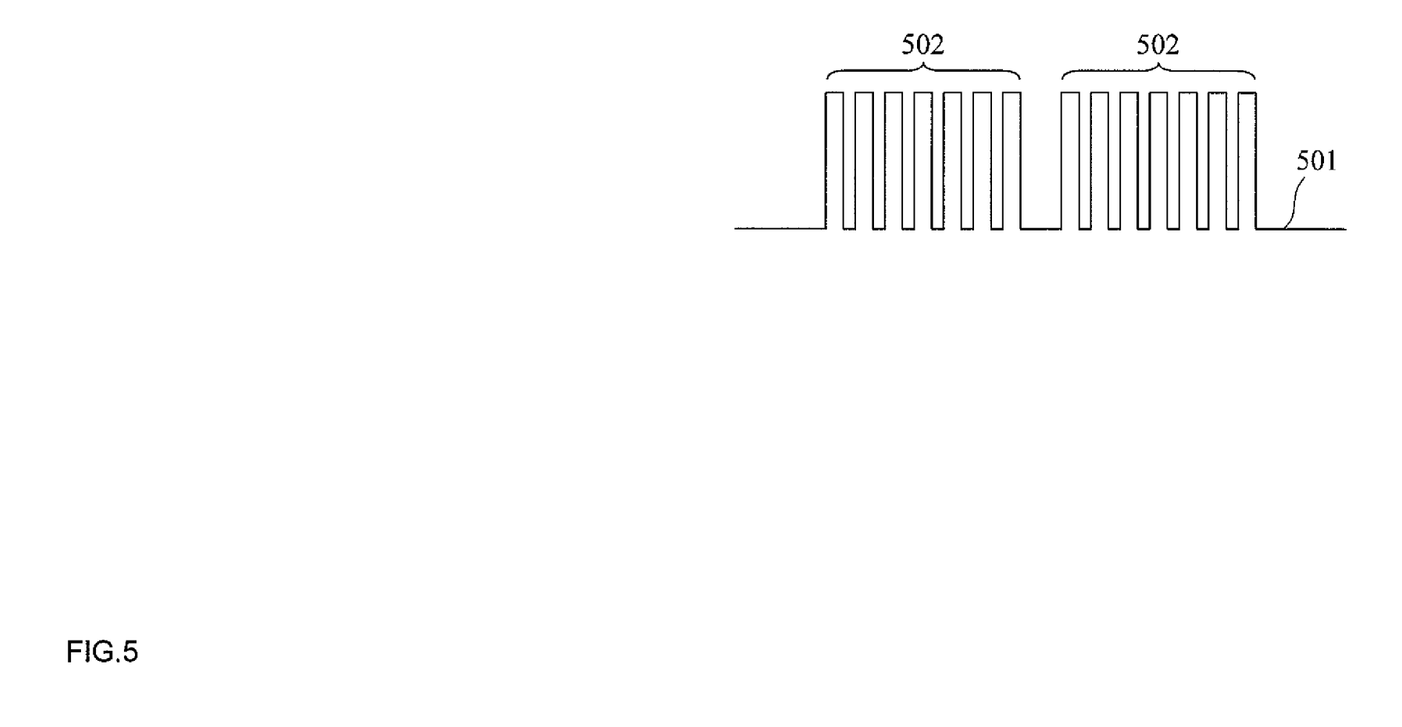
FIG. 5 is an example of a PBGF which is a refractive index profile in a radial direction on a straight line A.

FIGS. 4 and 5 are an example of a structure of the PBGF in which FIG. 4 is a transverse sectional view and FIG. 5 is a refractive index profile in a radial direction on a straight line A. As illustrated in FIG. 4, a PBGF 500 has a low refractive index area 501 formed of quartz without additive on center thereof, and high refractive index areas 502 with Ge and the like added are formed around the same. The high refractive index areas 502 are arranged in a periodic structure in a triangle grating pattern. By forming refractive index distribution of the low-refractive index area 501 and the high-refractive index areas 502 as illustrated in FIG. 5, a bandgap for a specific wavelength is formed. The bandgap may be formed in a desired wavelength by adjusting a diameter and an interval of the high-refractive index areas 502.

When allowing the light of the wavelength band in which the bandgap is formed to enter the PBGF 500, the light of the wavelength band is guided in the PBGF 500 while being confined in the low-reflective index area 501. On the other hand, when allowing the light of the wavelength band outside the bandgap to enter the PBGF 500, since the light of the wavelength band cannot stay in the low-refractive index area 501, this spreads to an entire PBGF 500 to be radiated. That is to say, in the PBGF 500, the low-refractive index area 501 serves as a core and the high-refractive index area 502 serves as a clad only for the light of the wavelength band in which the bandgap is formed.

In this embodiment, the wavelength conversion is performed by utilizing the Raman scattering generated in the PBGF 500. In general, the light, which propagates in the low-refractive index area 501, generates spontaneous Raman scattering light on a longer wavelength side than the wavelength of original light by the Raman scattering. Induced Raman scattering in which the spontaneous Raman scattering light induces further Raman scattering is generated from the light, which propagates in the low-refractive index area 501, and the Raman light is generated in large volume. In optical communication and the like, it is suggested about a Raman amplifier for allowing the light in the vicinity of 1450 nm to enter the optical fiber and amplifying the light of 1550 nm being a communication signal wavelength by an amplifying effect by the induced Raman scattering of the light utilizing this phenomenon.

A signal used in the optical communication is of a few hundred mW, and the light over several tens of W output by the fiber laser is not supposed to enter the Raman amplifier. If the laser of several tens of W is allowed to enter the optical fiber used in the optical communication, the Raman light is generated by the Raman scattering by only a few m, further, the secondary Raman light is generated from the Raman light and the light of a longer wavelength is generated one after another.

The PBGF 500 may optionally set a transmission band and a block band by the periodic structure and the like of the high-refractive index areas 502. The transmission band is intended to mean the band of the wavelength, which may be propagated by being confined in the low-refractive index area 501. When the laser light of the wavelength in the transmission band of the optical multiplexer according to this embodiment is allowed to enter, if the wavelength band in which the spontaneous Raman light is generated is within the bandgap wavelength band of the PBGF 500, the wavelength conversion by the induced Raman scattering occurs. The PBGF 500 has a structure in which the wavelength of the secondary Raman light of $\lambda_1$ is out of the bandgap wavelength band. Therefore, although primary induced Raman light of $\lambda_1$ is generated, secondary or higher-order induced Raman light of $\lambda_1$ does not propagate. That is to say, in the PBGF 500, since the high-order Raman light of longer wavelength is not generated to be propagated one after another unlike in the general optical fiber, a loss of power of the converted wavelength light (wavelength $\lambda_1$) may be inhibited, thereby realizing high conversion efficiency.

(Second Embodiment)

Figure 6:
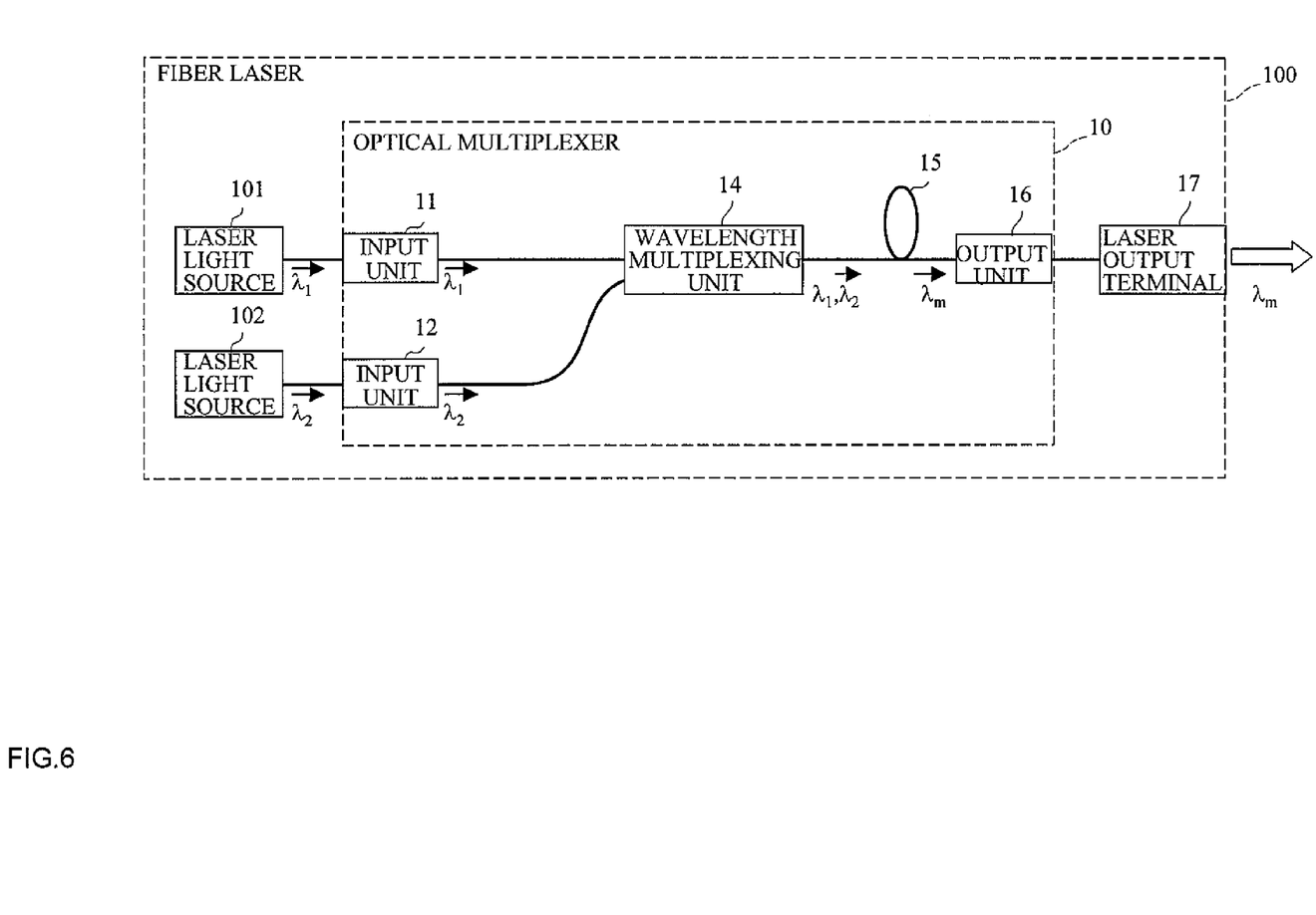
FIG. 6 is a schematic configuration diagram of a fiber laser according to a second embodiment.

FIG. 6 is a schematic configuration diagram of a fiber laser according to this embodiment. A fiber laser 100 according to this embodiment is provided with the optical multiplexer 10 according to the first embodiment, a plurality of laser light sources 101 and 102 of which output wavelengths are different from each other and a laser output terminal 17.

The plurality of laser light sources 101 and 102 supply the lights of the different output wavelengths to the different input units 11 and 12 of the optical multiplexer 10, respectively. For example, the laser light source 101 supplies the light of the wavelength $\lambda_1$ to the input unit 11. The laser light source 102 supplies the light of the wavelength $\lambda_2$ different from the wavelength $\lambda_1$ to the input unit 12. The optical multiplexer 10 converts the lights of a plurality of wavelengths $\lambda_1$ and $\lambda_2$ input to the input units 11 and 12 to the light of the single wavelength $\lambda_m$ to output from the output unit 16. The laser output terminal 17 outputs the light of the single wavelength $\lambda_m$. The optical multiplexer 10 is as described in the first embodiment.

A specific example of the fiber laser 100 is described.

An Yb-doped optical fiber laser of which oscillation wavelength $\lambda_1$ is 1040 nm and of which output is 50 W is used as the laser light source 101. The Yb-doped optical fiber laser of which oscillation wavelength $\lambda_2$ is 1090 nm and of which output is 50 W is used as the laser light source 102. The wavelength of the laser light source 102 is selected such that there is the oscillation wavelength in the wavelength band in which the Raman light is generated by propagation of the laser light of the laser light source 101 through the fiber being the multiplexed light converting unit 15. By such combination, it becomes possible to make the induced Raman scattering of the laser light of which wavelength is 1040 nm to easily occur in the multiplexed light converting unit 15.

As the multiplexed light converting unit 15, 50 m of the PBGF having the bandgap with the wavelength not shorter than 1030 nm and not longer than 1100 nm of which mode field diameter is 10 μm is used. The laser light of which wavelength is 1040 nm generates the Raman light in the vicinity of 1090 nm by the Raman scattering when propagating in the PBGF. At that time, since the laser light of 1090 nm is simultaneously allowed to enter the PBGF, the laser light of 1090 nm induces the induced Raman scattering of the laser light of 1040 nm and the laser light of which wavelength is 1040 nm is converted to the laser light of which wavelength is 1090 nm at high efficiency. On the other hand, although the band in which the Raman light of the laser light of 1090 nm is generated is in the vicinity of 1140 nm, the vicinity of 1140 nm is outside the bandgap wavelength band and the light of this wavelength cannot be guided to the low-refractive index area (reference numeral 501 in FIGS. 4 and 5), so that further conversion of the wavelength does not occur. As a result, the laser light of which wavelength is 1090 nm as the single wavelength $\lambda_m$ is output from the laser output terminal 17 as illustrated in FIGS. 2 and 3. The output of the output laser light is 84 W, and it is confirmed that the two laser lights of different wavelengths are multiplexed at the high efficiency to be output as the laser light of the single wavelength.

Also, when actually using the fiber laser 100 in processing and the like, there is a case in which the laser light reflected outside the laser output terminal 17 enters again the fiber laser 100. The reflected light goes back in the optical multiplexer 10 to reach the laser light sources 101 and 102. At that time, when the wavelength of the laser output is within the gain wavelength band of a gain medium used as the laser light sources 101 and 102 connected to the input units 11 and 12 of the optical multiplexer 10, there is a case in which the reflected light is amplified by the gain medium to brake the laser light sources 101 and 102. In order to prevent this, the single wavelength $\lambda_m$ output from the laser output terminal 17 is set outside the gain wavelength band of the gain medium used as the laser light sources 101 and 102.

In this embodiment, the Yb-doped optical fiber lasers are connected to the input units 11 and 12 as the laser light sources 101 and 102 and the Yb-doped optical fiber has a large gain in the wavelength band from the wavelength 1020 nm to the wavelength approximately 1100 nm. Therefore, by extending the bandgap wavelength band of the PBGF used as the multiplexed light converting unit 15 to approximately 1150 nm, the wavelength conversion to the wavelength 1140 nm inhibited in the first embodiment occurs. In this manner, the output from the laser output terminal 17 may be set outside the gain wavelength band of the Yb-doped optical fiber and brake of the laser light sources 101 and 102 may be prevented even when the reflected light enters the laser light sources 101 and 102.

(Third Embodiment)

Figure 7:
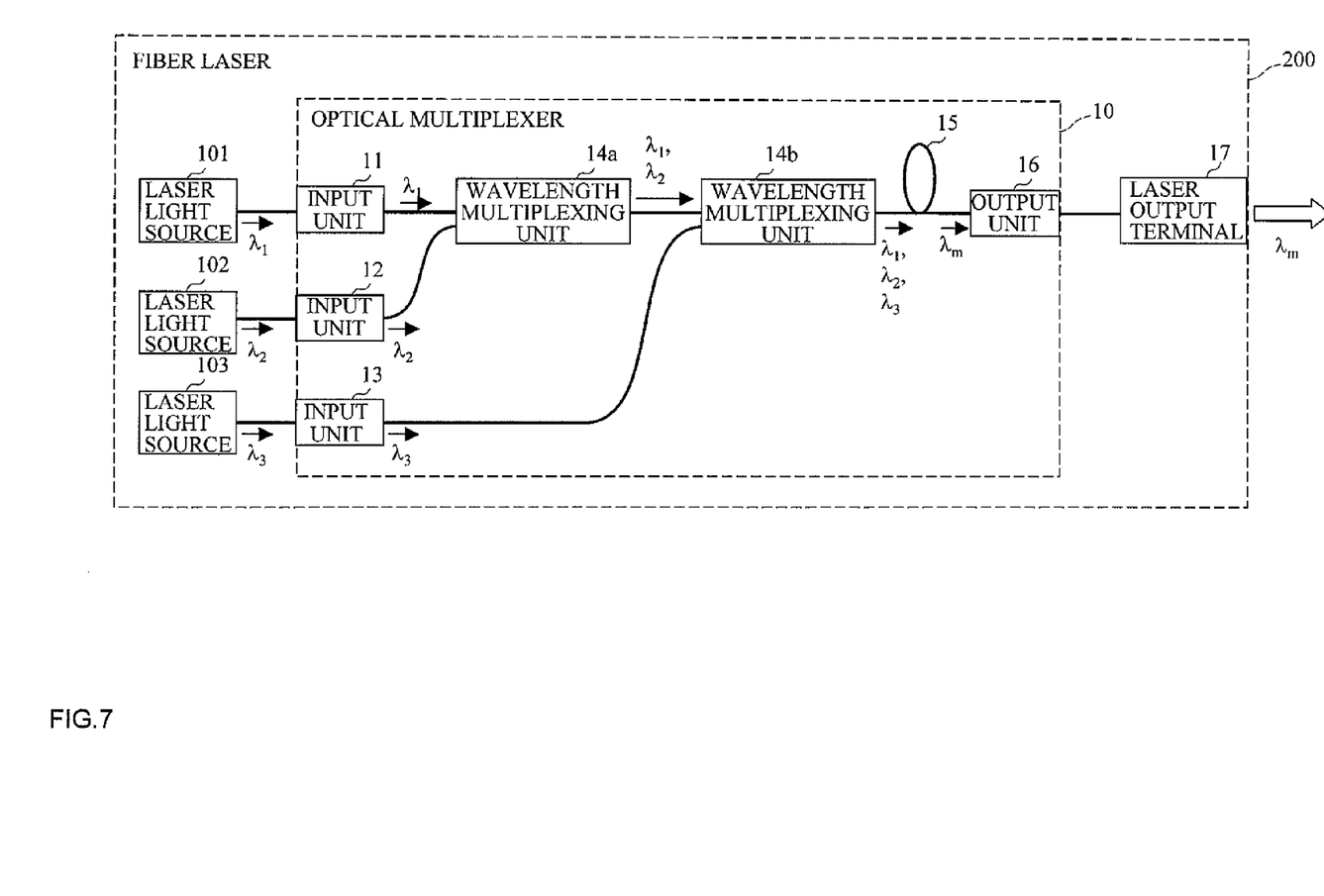
FIG. 7 is a schematic configuration diagram of a fiber laser according to a third embodiment.

FIG. 7 is a schematic configuration diagram of a fiber laser according to this embodiment. A fiber laser 200 according to this embodiment is provided with three laser light sources 101, 102 and 103, three input units 11, 12 and 13 and two wavelength multiplexing units 14*a* and 14*b*.

As compared to the above-described second embodiment, the number of the wavelengths included in the multiplexed light input to the multiplexed light converting unit 15 increases from two to three, so that the optical intensity of the multiplexed light input to the multiplexed light converting unit 15 increases. According to this, the optical intensity of the single wavelength $\lambda_m$ output from the output unit 16 may be increased.

A plurality of laser light sources 101, 102 and 103 are connected to the input units 11, 12 and 13, respectively. The wavelength multiplexing units 14*a* and 14*b* wavelength-multiplex the lights of a plurality of wavelengths $\lambda_1$, $\lambda_2$ and $\lambda_3$ input from the input units 11, 12 and 13 different for each of the wavelengths $\lambda_1$, $\lambda_2$ and $\lambda_3$, respectively, to one multiplexed light. Herein, the wavelengths $\lambda_1$, $\lambda_2$ and $\lambda_3$ different from one another are the wavelength 1040 nm, a wavelength of primary Raman light 1090 nm and the wavelength of the secondary Raman light 1140 nm, respectively, for example.

The wavelength multiplexing units 14a and 14b are 2×1 WDM and the wavelength multiplexing units 14a and 14b are multistage connected. In this case, the wavelength multiplexing unit 14a wavelength-multiplexes the lights of the plurality of wavelengths $\lambda_1$ and $\lambda_2$ input from the input units 11 and 12, respectively, to one multiplexed light. The wavelength multiplexing unit 14b wavelength-multiplexes the lights of the wavelengths $\lambda_1$ and $\lambda_2$ input from the input units 11 and 12, respectively, and the light of the wavelength $\lambda_3$ input from the input unit 13. The multiplexed light of the plurality of wavelengths $\lambda_1$, $\lambda_2$ and $\lambda_3$ is generated by the wavelength multiplexing units 14a and 14b.

Also, the wavelength multiplexing units 14a and 14b may be made a common wavelength multiplexing unit. In this case, the lights of the plurality of wavelengths $\lambda_1$, $\lambda_2$ and $\lambda_3$ input from the input units 11, 12 and 13 are wavelength-multiplexed by one wavelength multiplexing unit. According to this, the multiplexed light of the plurality of wavelengths $\lambda_1$, $\lambda_2$ and $\lambda_3$ is generated. By wavelength-multiplexing the lights of a plurality of wavelengths by one wavelength multiplexing unit, the number of parts may be decreased.

The multiplexed light converting unit 15 converts the multiplexed light of a plurality of wavelengths from the wavelength multiplexing unit 14 to the light of the single wavelength $\lambda_m$. When the single wavelength $\lambda_m$ is the same wavelength as the longest wavelength $\lambda_3$ out of the wavelengths $\lambda_1$, $\lambda_2$ and $\lambda_3$ included in the multiplexed light from the wavelength multiplexing unit 14, the multiplexed light converting unit 15 converts to the same wavelength 1140 nm as the longest wavelength $\lambda_3$. When the single wavelength $\lambda_m$ is the wavelength longer than the longest wavelength $\lambda_2$, the multiplexed light converting unit 15 converts to the wavelength of the tertiary Raman light 1200 nm as the single wavelength $\lambda_m$. Then, the output unit 16 and the laser output terminal 17 output the light of the single wavelength $\lambda_m$.

(Fourth Embodiment)

Figure 8:
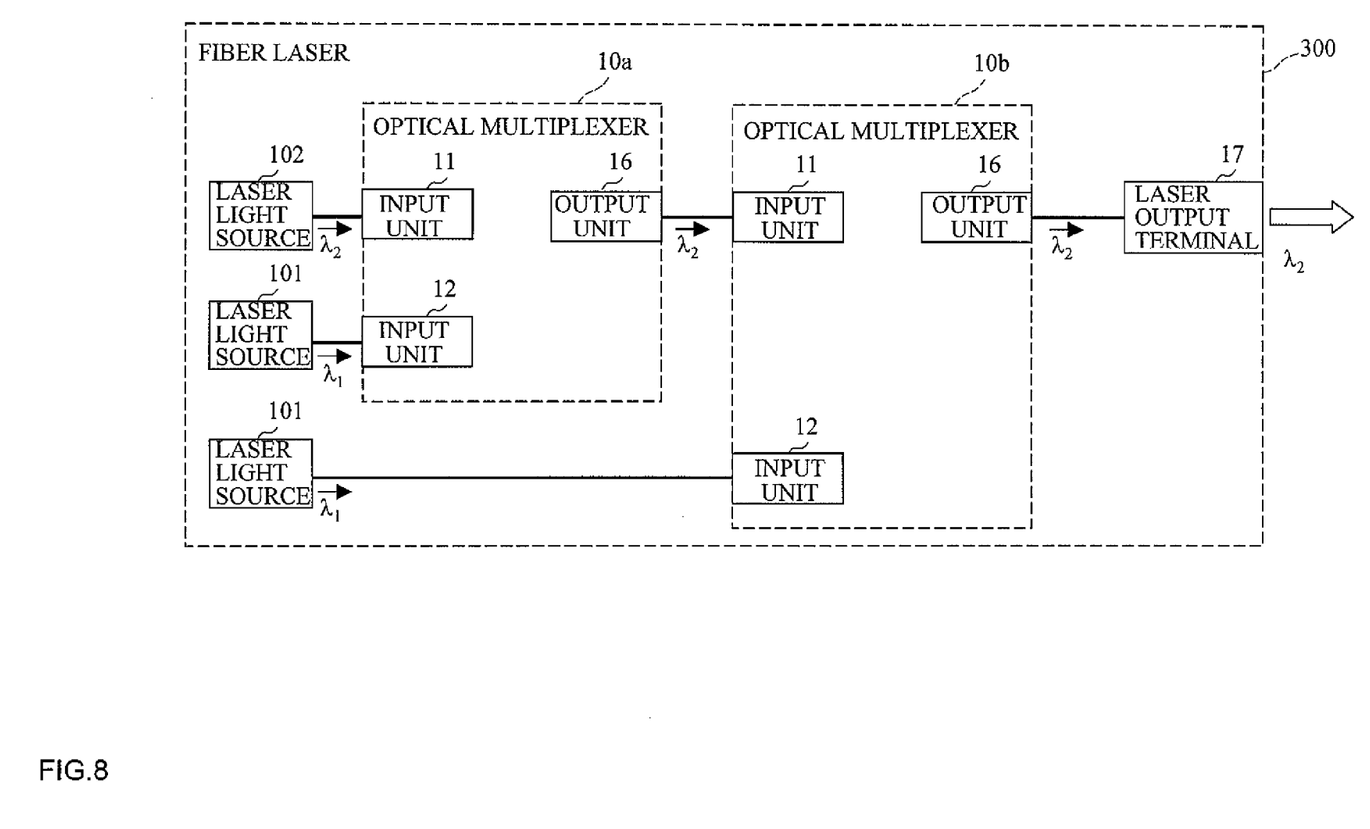
FIG. 8 is a schematic configuration diagram of a fiber laser according to a fourth embodiment.

FIG. 8 is a schematic configuration diagram of a fiber laser according to this embodiment. A fiber laser 300 according to this embodiment is provided with optical multiplexers 10a and 10b and has a configuration in which the optical multiplexers 10 described in the first embodiment are multistage connected.

A plurality of laser light sources 102 and 101 are connected to the input units 11 and 12 of the optical multiplexer 10a and the lights of the wavelengths $\lambda_2$ and $\lambda_1$ are input, respectively. Then, the light of the same wavelength as the longest wavelength $\lambda_2$ is output from the output unit 16 of the optical multiplexer 10a as the single wavelength $\lambda_m$. For example, when the wavelength $\lambda_1$ is 1040 nm and the wavelength $\lambda_2$ is 1090 nm, the light of the same wavelength 1090 nm as the longest wavelength $\lambda_2$ is output from the output unit 16 of the optical multiplexer 10b.

The output unit 16 of the optical multiplexer 10a is connected to the input unit 11 of the optical multiplexer 10b and the light of the wavelength $\lambda_2$ is input. On the other hand, the laser light source 101 is connected to the input unit 12 of the optical multiplexer 10b and the light of the wavelength $\lambda_1$ is input. Then, the light of the same wavelength as the longest wavelength $\lambda_2$ is output from the output unit 16 of the optical multiplexer 10a as the single wavelength $\lambda_m$. For example, the light of the same wavelength 1090 nm as the longest wavelength $\lambda_2$ is output from the output unit 16 of the optical multiplexer 10b.

In this manner, by multistage connecting the optical multiplexers 10a and 10b and connecting the laser light source 101 of the wavelength $\lambda_1$ to the input unit 12 of the optical multiplexers 10a and 10b, the optical intensity of the longest wavelength $\lambda_2$ may be increased according to the number of the optical multiplexers 10a and 10b, which are multistage connected.

Although a case in which the two optical multiplexers are multistage connected is described in this embodiment, by increasing the number to three, four, five, etc., so as not to be smaller than three, the optical intensity of the same wavelength as the longest wavelength $\lambda_2$ from the output unit 16 may be further increased.

(Fifth Embodiment)

Figure 9:
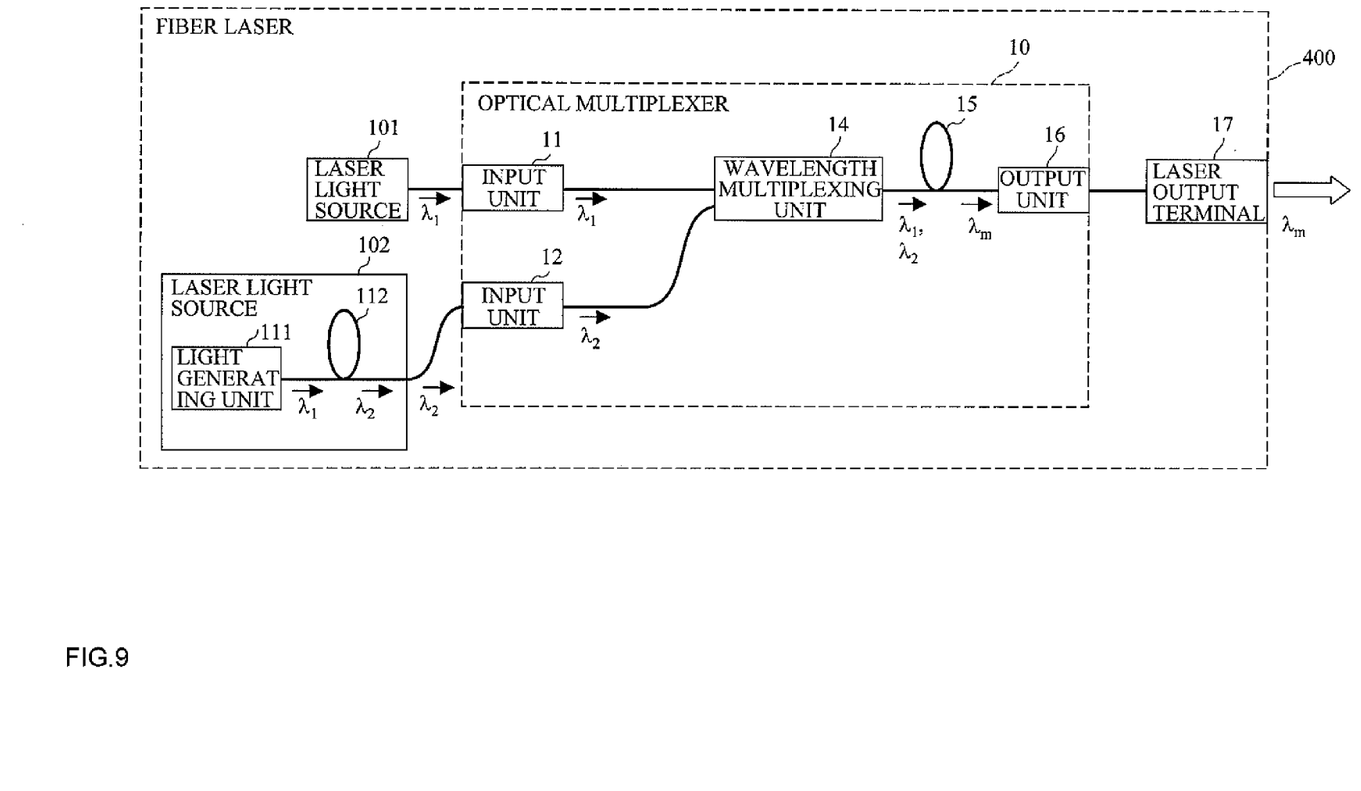
FIG. 9 is a schematic configuration diagram of a fiber laser according to a fifth embodiment.

FIG. 9 is a schematic configuration diagram of a fiber laser according to this embodiment. In a fiber laser 400 according to this embodiment, the laser light source 102 described in the second embodiment is provided with a light generating unit 111 and an output light converting unit 112.

The laser light sources of different wavelengths are multiplexed in the second to fourth embodiments. Since the wavelength multiplexing is used, the laser lights of the same wavelength cannot be multiplexed. However, by allowing at least one laser light source 102 out of a plurality of laser light sources 101 and 102 to include the light generating unit 111 and the output light converting unit 112, the output light wavelength of the laser light source 101 and the output light wavelength of the light generating unit 111 may be made the same. That is to say, even when the laser light source 101 and the light generating unit 111 have the same configuration, the single wavelength light with high intensity may be obtained by the wavelength multiplexing.

For example, the laser light source, which oscillates at the wavelength $\lambda_1$, is used as the laser light source 101 and the light generating unit 111. The laser light of the wavelength $\lambda_1$ input from the input unit 11 is directly input to the wavelength multiplexing unit 14.

On the other hand, the laser light of the wavelength $\lambda_1$ output from the light generating unit 111 is input to the output light converting unit 112 and is converted to the light of the wavelength $\lambda_2$ by the Raman scattering to be output. The same PBGF as that of the multiplexed light converting unit 15 may be used as the output light converting unit 112. Then, the laser light source 102 inputs the light of the output wavelength $\lambda_2$ to be supplied to the optical multiplexer 10 to the input unit 12.

Figure 10:
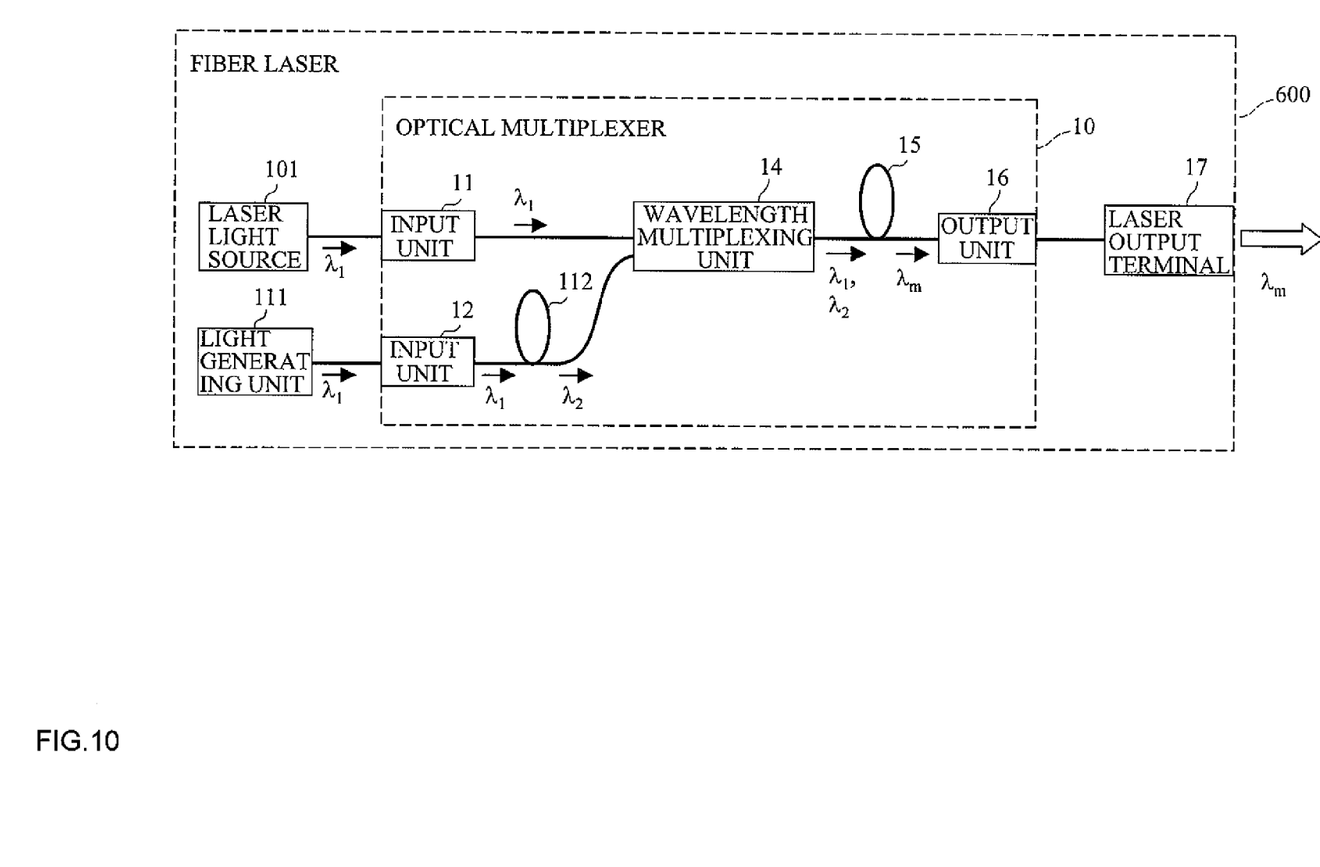
FIG. 10 is a schematic configuration diagram of a fiber laser according to a sixth embodiment.

Meanwhile, although it is configured such that the laser light source 102 is provided with the output light converting unit 112 in this embodiment, the output light converting unit 112 may be provided between the input unit 12 and the wavelength multiplexing unit 14. FIG. 10 is a schematic configuration diagram of a fiber laser according to a sixth embodiment. In a case of a fiber laser 600 illustrated in FIG. 10 also, the laser lights of the wavelengths $\lambda_1$ and $\lambda_2$ different from each other are input to the input ports of the wavelength multiplexing unit 14. Therefore, it is possible to multiplex without a loss by the wavelength multiplexing unit 14. Then, the light multiplexed by the wavelength multiplexing unit 14 is output from the output unit 16 as the light of the wavelength $\lambda_m$ after a process similar to that of the first embodiment. An output of the output laser light is 82 W, and it has been confirmed that two fiber laser outputs of the same wavelength are multiplexed to be output as the laser light of a single wavelength component at efficiency substantially equivalent to that of the second embodiment.

With the configuration according to this embodiment, even when the light of the same wavelength $\lambda_1$ is input to the input units 11 and 12, it is possible to convert the light of the wavelength $\lambda_1$ input from the input unit 12 to the wavelength $\lambda_2$ before inputting the same to the wavelength multiplexing unit 14. According to this, it is possible to wavelength-multiplex by the wavelength multiplexing unit 14 without the loss.

Although the PBGF is heretofore described as an example of the configuration to generate the continuous loss in the waveguide direction for the Raman light of a desired order of the multiplexed light converting unit 15 in each described embodiment, the multiplexed light converting unit 15 is not limited to the PBGF as long as it is configured to transmit the wavelength of the converted light and to generate the continuous loss in the waveguide direction for the Raman light of the desired order. In addition to the PBGF, the fiber wound into the coil pattern to generate a bending loss from the desired wavelength may be used as the multiplexed light converting unit 15. Also, by using the fiber including dopant to absorb the light of the wavelength band of which generation is desired to be inhibited as the multiplexed light converting unit 15, an effect to generate the continuous loss in the waveguide direction for the Raman light of the desired order may be obtained.

INDUSTRIAL APPLICABILITY

Since the present invention may be utilized for a processing fiber laser due to development of a high-output fiber laser, this may be utilized for a broad range of industry such as an electrical equipment industry and a general machinery industry.

EXPLANATIONS OF REFERENCE NUMERALS 10, 10a, 10b: optical multiplexer
11, 12, 13: input unit
14, 14a, 14b: wavelength multiplexing unit
15: multiplexed light converting unit
16: output unit
17: laser output terminal
100, 200, 300, 400, 600: fiber laser
101, 102, 103: laser light source
111: light generating unit
112: output light converting unit
500: PBGF
501: low-refractive index area
502: high-refractive index area

The invention claimed is:

1. An optical multiplexer, comprising:
a wavelength multiplexing unit for wavelength-multiplexing lights of a plurality of wavelengths input from input units different for each wavelength to one multiplexed light; and
a multiplexed light converting unit for generating Raman light by at least one wavelength out of the wavelengths included in the multiplexed light from the wavelength multiplexing unit and converting the multiplexed light from the wavelength multiplexing unit to light of a single wavelength included in a wavelength band of the Raman light,
wherein the plurality of wavelengths includes a wavelength of high-order Raman light caused by one of the plurality of wavelengths in the multiplexed light converting unit.

2. The optical multiplexer according to claim 1, wherein the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength.

3. The optical multiplexer according to claim 2, wherein the multiplexed light converting unit is a fiber for continuously causing a loss in a waveguide direction for N-th order Raman light out of N-th order of the Raman light and inhibiting generation of N-th order induced Raman scattering light.

4. The optical multiplexer according to claim 3, wherein the fiber is a photonic bandgap fiber (PBGF) in which an (N-1)-th order wavelength is set within a bandgap wavelength band and a wavelength of the N-th order Raman light is set outside the bandgap wavelength band.

5. The optical multiplexer according to claim 1, wherein the single wavelength is the same wavelength as a longest wavelength out of the wavelengths included in the multiplexed light from the wavelength multiplexing unit.

6. The optical multiplexer according to claim 5, wherein the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength.

7. The optical multiplexer according to claim 6, wherein the multiplexed light converting unit is a fiber for continuously causing a loss in a waveguide direction for N-th order Raman light out of N-th order of the Raman light and inhibiting generation of N-th order induced Raman scattering light.

8. The optical multiplexer according to claim 7, wherein the fiber is a photonic bandgap fiber (PBGF) in which an (N-1)-th order wavelength is set within a bandgap wavelength band and a wavelength of the N-th order Raman light is set outside the bandgap wavelength band.

9. A fiber laser, comprising
the optical multiplexer according to claim 5; and
a plurality of laser light sources of which output wavelengths are different from each other, wherein one of the plurality of laser light sources outputs the one of the plurality of wavelengths,
other laser light source except the one light source of the plurality of laser light sources outputs the high-order Raman light caused by the one of the plurality of wavelengths in the multiplexed light converting unit,
the plurality of laser light sources supply lights of the output wavelengths to the different input units of the optical multiplexer.

10. The optical multiplexer according to claim 1, wherein the single wavelength is the wavelength longer than a longest wavelength out of the wavelengths included in the multiplexed light from the wavelength multiplexing unit.

11. The optical multiplexer according to claim 10, wherein the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength.

12. The optical multiplexer according to claim 11, wherein the multiplexed light converting unit is a fiber for continuously causing a loss in a waveguide direction for N-th order Raman light out of N-th order of the Raman light and inhibiting generation of N-th order induced Raman scattering light.

13. The optical multiplexer according to claim 12, wherein the fiber is a photonic bandgap fiber (PBGF) in which an (N-1)-th order wavelength is set within a bandgap wavelength band and a wavelength of the N-th order Raman light is set outside the bandgap wavelength band.

14. A fiber laser, comprising
the optical multiplexer according to claim 10; and
a plurality of laser light sources of which output wavelengths are different from each other, wherein one of the plurality of laser light sources outputs the one of the plurality of wavelengths,
other laser light source except the one light source of the plurality of laser light sources outputs the high-order Raman light caused by the one of the plurality of wavelengths in the multiplexed light converting unit,
the plurality of laser light sources supply lights of the output wavelengths to the different input units of the optical multiplexer.

15. A fiber laser, comprising
the optical multiplexer according to claim 1; and
a plurality of laser light sources of which output wavelengths are different from each other, wherein one of the plurality of laser light sources outputs the one of the plurality of wavelengths,
other laser light source except the one light source of the plurality of laser light sources outputs the Raman light caused by the one of the plurality of wavelengths in the multiplexed light converting unit,
the plurality of laser light sources supply lights of the output wavelengths to the different input units of the optical multiplexer.

16. The fiber laser according to claim 15, wherein at least one of the plurality of laser light sources is provided with an output light converting unit for generating Raman light by light allowed to enter and converting to the light of the output wavelength to be supplied to the optical multiplexer.

17. A fiber laser, comprising
the optical multiplexer according to claim 1; and
a plurality of laser light sources of which output wavelengths are different from each other, wherein the plurality of laser light sources supply lights of the output wavelengths to the different input units of the optical multiplexer.

18. The fiber laser according to claim 17, wherein at least one of the plurality of laser light sources is provided with an output light converting unit for generating Raman light by light allowed to enter and converting to the light of the output wavelength to be supplied to the optical multiplexer.

19. A fiber laser, comprising
an optical multiplexer, the optical multiplexer comprises:
a wavelength multiplexing unit for wavelength-multiplexing lights of a plurality of wavelengths input from input units different for each wavelength to one multiplexed light; and
a multiplexed light converting unit for generating Raman light by at least one wavelength out of the wavelengths included in the multiplexed light from the wavelength multiplexing unit and converting the multiplexed light from the wavelength multiplexing unit to light of a single wavelength included in a wavelength band of the Raman light,
wherein the plurality of wavelengths includes a wavelength of Raman light caused by one of the plurality of wavelengths in the multiplexed light converting unit; and
a plurality of laser light sources of which output wavelengths are different from each other, wherein one of the plurality of laser light sources outputs the one of the plurality of wavelengths,
other laser light source except the one light source of the plurality of laser light sources outputs the Raman light caused by the one of the plurality of wavelengths in the multiplexed light converting unit,
the plurality of laser light sources supply lights of the output wavelengths to the different input units of the optical multiplexer.

20. The fiber laser according to claim 19, wherein at least one of the plurality of laser light sources is provided with an output light converting unit for generating Raman light by light allowed to enter and converting to the light of the output wavelength to be supplied to the optical multiplexer.

21. The optical multiplexer according to claim 19, wherein the single wavelength is the same wavelength as a longest wavelength out of the wavelengths included in the multiplexed light from the wavelength multiplexing unit.

22. The optical multiplexer according to claim 21, wherein the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength.

23. The optical multiplexer according to claim 22, wherein the multiplexed light converting unit is a fiber for continuously causing a loss in a waveguide direction for N-th order Raman light out of N-th order of the Raman light and inhibiting generation of N-th order induced Raman scattering light.

24. The optical multiplexer according to claim 23, wherein the fiber is a photonic bandgap fiber (PBGF) in which an (N-1)-th order wavelength is set within a bandgap wavelength band and a wavelength of the N-th order Raman light is set outside the bandgap wavelength band.

25. The optical multiplexer according to claim 19, wherein the single wavelength is the wavelength longer than a longest wavelength out of the wavelengths included in the multiplexed light from the wavelength multiplexing unit.

26. The optical multiplexer according to claim 25, wherein the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength.

27. The optical multiplexer according to claim 26, wherein the multiplexed light converting unit is a fiber for continuously causing a loss in a waveguide direction for N-th order Raman light out of N-th order of the Raman light and inhibiting generation of N-th order induced Raman scattering light.

28. The optical multiplexer according to claim 27, wherein the fiber is a photonic bandgap fiber (PBGF) in which an (N-1)-th order wavelength is set within a bandgap wavelength band and a wavelength of the N-th order Raman light is set outside the bandgap wavelength band.

29. The optical multiplexer according to claim 19, wherein the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength.

30. The optical multiplexer according to claim 29, wherein the multiplexed light converting unit is a fiber for continuously causing a loss in a waveguide direction for N-th order Raman light out of N-th order of the Raman light and inhibiting generation of N-th order induced Raman scattering light.

31. The optical multiplexer according to claim 30, wherein the fiber is a photonic bandgap fiber (PBGF) in which an (N-1)-th order wavelength is set within a bandgap wavelength band and a wavelength of the N-th order Raman light is set outside the bandgap wavelength band.

32. An optical multiplexer, comprising:
a wavelength multiplexing unit for wavelength-multiplexing lights of a plurality of wavelengths input from input units different for each wavelength to one multiplexed light; and
a multiplexed light converting unit for generating Raman light by at least one wavelength out of the wavelengths included in the multiplexed light from the wavelength multiplexing unit and converting the multiplexed light from the wavelength multiplexing unit to light of a single wavelength included in a wavelength band of the Raman light,
wherein the plurality of wavelengths includes a wavelength of Raman light caused by one of the plurality of wavelengths in the multiplexed light converting unit,
wherein the single wavelength is the same wavelength as a longest wavelength out of the wavelengths included in the multiplexed light from the wavelength multiplexing unit,
wherein the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength, and
wherein the multiplexed light converting unit is a fiber for continuously causing a loss in a waveguide direction for N-th order Raman light out of N-th order of the Raman light and inhibiting generation of N-th order induced Raman scattering light.

33. The optical multiplexer according to claim 32, wherein the fiber is a photonic bandgap fiber (PBGF) in which an (N-1)-th order wavelength is set within a bandgap wavelength band and a wavelength of the N-th order Raman light is set outside the bandgap wavelength band.

34. A fiber laser, comprising
the optical multiplexer according to claim 33; and
a plurality of laser light sources of which output wavelengths are different from each other, wherein the plurality of laser light sources supply lights of the output wavelengths to the different input units of the optical multiplexer.

35. The fiber laser according to claim 34, wherein at least one of the plurality of laser light sources is provided with an output light converting unit for generating Raman light by light allowed to enter and converting to the light of the output wavelength to be supplied to the optical multiplexer.

36. A fiber laser, comprising
the optical multiplexer according to claim 32; and
a plurality of laser light sources of which output wavelengths are different from each other, wherein the plurality of laser light sources supply lights of the output wavelengths to the different input units of the optical multiplexer.

37. The fiber laser according to claim 36, wherein at least one of the plurality of laser light sources is provided with an output light converting unit for generating Raman light by light allowed to enter and converting to the light of the output wavelength to be supplied to the optical multiplexer.

38. An optical multiplexer, comprising:
a wavelength multiplexing unit for wavelength-multiplexing lights of a plurality of wavelengths input from input units different for each wavelength to one multiplexed light; and
a multiplexed light converting unit for generating Raman light by at least one wavelength out of the wavelengths included in the multiplexed light from the wavelength multiplexing unit and converting the multiplexed light from the wavelength multiplexing unit to light of a single wavelength included in a wavelength band of the Raman light,
wherein the plurality of wavelengths includes a wavelength of Raman light caused by one of the plurality of wavelengths in the multiplexed light converting unit,
wherein the single wavelength is the wavelength longer than a longest wavelength out of the wavelengths included in the multiplexed light from the wavelength multiplexing unit,
wherein the multiplexed light converting unit transmits the wavelength not shorter than a shortest wavelength and not longer than the single wavelength out of the wavelengths included in the multiplexed light from the wavelength multiplexing unit and blocks the wavelength longer than the single wavelength, and
wherein the multiplexed light converting unit is a fiber for continuously causing a loss in a waveguide direction for N-th order Raman light out of N-th order of the Raman light and inhibiting generation of N-th order induced Raman scattering light.

39. The optical multiplexer according to claim 38, wherein the fiber is a photonic bandgap fiber (PBGF) in which an (N-1)-th order wavelength is set within a bandgap wavelength band and a wavelength of the N-th order Raman light is set outside the bandgap wavelength band.

40. A fiber laser, comprising
the optical multiplexer according to claim 39; and
a plurality of laser light sources of which output wavelengths are different from each other, wherein the plurality of laser light sources supply lights of the output wavelengths to the different input units of the optical multiplexer.

41. The fiber laser according to claim 40, wherein at least one of the plurality of laser light sources is provided with an output light converting unit for generating Raman light by light allowed to enter and converting to the light of the output wavelength to be supplied to the optical multiplexer.

42. A fiber laser, comprising
the optical multiplexer according to claim 38; and
a plurality of laser light sources of which output wavelengths are different from each other, wherein the plurality of laser light sources supply lights of the output wavelengths to the different input units of the optical multiplexer.

43. The fiber laser according to claim 42, wherein at least one of the plurality of laser light sources is provided with an output light converting unit for generating Raman light by light allowed to enter and converting to the light of the output wavelength to be supplied to the optical multiplexer.

* * * * *